Aug. 28, 1951     E. WILDHABER     2,565,539
GEAR DRIVE

Filed Aug. 27, 1947     3 Sheets-Sheet 1

INVENTOR.
ERNEST WILDHABER
BY
ATTORNEY

Aug. 28, 1951 — E. WILDHABER — 2,565,539
GEAR DRIVE
Filed Aug. 27, 1947 — 3 Sheets-Sheet 2

INVENTOR.
ERNEST WILDHABER
BY
ATTORNEY

Patented Aug. 28, 1951

2,565,539

UNITED STATES PATENT OFFICE 2,565,539

GEAR DRIVE

Ernest Wildhaber, Brighton, N. Y.

Application August 27, 1947, Serial No. 770,820

15 Claims. (Cl. 74—410)

The present invention relates to gear drives and particularly to rear axle drives for automotive vehicles.

One object of the invention is to provide a gear drive by which more power can be transmitted through a drive of a given size so that the drive can be made smaller and more compact than has heretofore been possible.

Another object of the invention is to provide a rear axle driven for automotive vehicles in which, through the use of two drive pinions meshing with but a single driven gear, the size of the driven ring gear may be reduced, as compared with conventional designs, thereby to provide increased road clearance and permit further lowering of the body of the vehicle.

A further object of the invention is to provide a gear drive in which two pinions mesh with and simultaneously drive a gear and in which means is provided to insure that the power is transmitted equally through the two pinions or in any desired proportion.

A further object of the invention is to provide a drive having two tapered pinions mounted on axes angularly disposed to and offset in opposite directions from the axis of the mating tapered gear and in which provision is made to distribute the load evenly between the two pinions.

A further object of the invention is to provide a two speed drive for the rear axle of an automotive vehicle in which two pinions mesh with and simultaneously drive the ring gear at low speed and only one of the pinion drives at high speed, Another object of the invention is to provide a two speed axle drive of the character described which is so constructed that wear can be substantially equalized on the two pinions.

Other objects of the invention will be apparent hereinafter from the specification and the recital of the appended claims.

Figure 1:
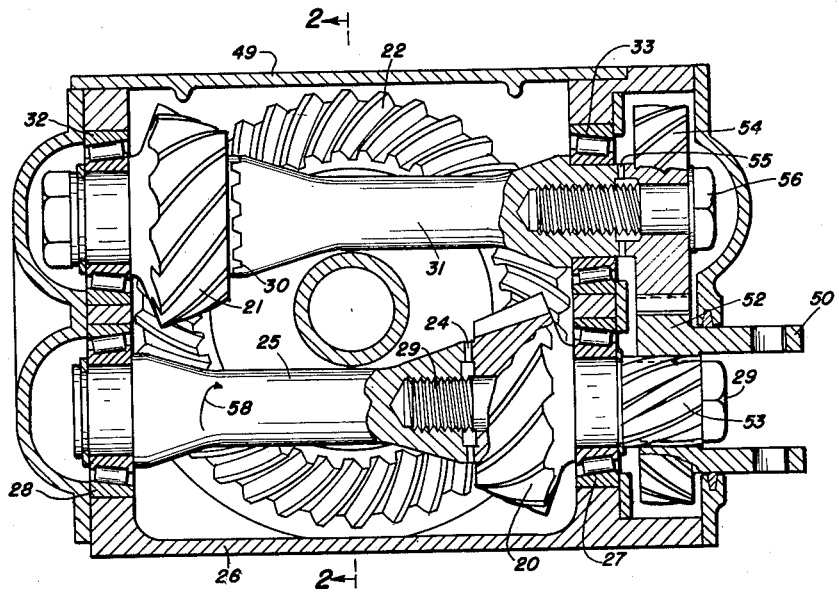
Fig. 1 is a sectional view taken on the line 1—1 of Fig. 2 and showing a drive constructed according to one embodiment of the invention.

Referring now to Figs. 1 and 2, 20 and 21 denote, respectively, the two drive pinions, and 22 their mating driven gear. The two pinions are longitudinally curved hypoid pinions of the same hand, left hand in the instance illustrated. They are mounted on parallel axes disposed at right angles to the axis of their common mating gear 22 and they are equally offset from the gear axis in opposite directions, the pinion 20 being disposed below the gear axis and at the right hand side of the same as viewed in Fig. 1, and the pinion 21 being disposed above the gear axis and at the left hand side of the same as viewed in this figure. The gear 22 is a longitudinally curved toothed hypoid gear whose teeth, being curved longitudinally, are inclined to axial planes containing the gear axis.

The pinions 20 and 21 and the gear 22 may be made in known manner. They may all be generated; or the tooth surfaces of the gear may be form-cut and the mating tooth surfaces of the pinions generated conjugate to them. In the latter case, opposite sides of each tooth space of the gear may be cut as coaxial surfaces of revolution, and the pinion tooth surfaces may be generated conjugate to such surfaces.

The two pinions may be identical except for their shank portions. The pinion 20 is connected by means of a toothed face coupling 24 to a shaft 25 and the pinion and shaft are journaled in the gear casing 26 on anti-friction bearings 27 and 28, the bearing 28 supporting one end of the shaft 25 and the bearing 27 engaging the shank of the pinion 20. The coupling 24 is held in engaged position by a bolt 29 which is mounted in the shank of the pinion 20 and threads into the shaft 25. The pinion 21 is fixedly connected by a toothed face coupling 30 with a shaft 31 which extends parallel to shaft 25. Pinion 21 and shaft 31 are journaled in the casing 26 on the anti-friction bearing 32, which is mounted on the shank of the pinion, and on the anti-friction bearing 33 in which one end of the shaft is mounted.

The gear 22 is secured in conventional manner, as by means of bolts 34, to the housing 35 of a differential which may be of conventional structure and which comprises the side gears 36 and 37 and the planetary pinions 38. The latter are journaled on the spider 39 of the differential. The side gears 36 and 37 have splined connection in the usual manner to the axle shafts 40 and 41 of the vehicle which, in turn, are connected in known manner with the two rear wheels of the vehicle.

The differential housing 35 is journaled in the casing 26 on anti-friction bearings 45 and 46. The casing 26 may constitute the central portion of the rear axle to which the tubular side portions 47 and 48 are rigidly bolted. The casing is closed by a cover 49.

The two drive pinions 20 and 21 are adapted to mesh with and drive the gear 22 simultaneously. These pinions may be driven from the motor of the vehicle through a conventional transmission (not shown), a propeller shaft (not shown), and a universal joint, one part of which is indicated at 50. This universal joint may be a Hooke's joint or a uniform motion universal joint. In either case, it is an element adapted to transmit power without appreciable end-thrust. The part 50 of the universal joint is integral with a helical gear 52. This gear is slidably connected operatively with drive pinion 20 by helical splines 53 that are provided on the shank of this drive pinion. The gear 52 meshes with another helical gear 54. This gear is connected to the shaft 31 by a toothed face coupling 55. This coupling 55 is secured in fixed position by a bolt 56 that threads into the shaft 31.

The helical splines 53 are of the same hand as the teeth of hypoid drive pinion 20. Their axial lead is made approximately equal to the average lead of the two sides of the pinion teeth. With this arrangement, the thrust exerted on the helical splines approximately balances the axial thrust reaction of the pinion teeth. Thus, if the pinion 20 is driven through a power source in the direction of the arrow 58, the thrust exerted on the splines 53 is inwardly, that is, to the left. The thrust reaction exerted on the pinion teeth by the gear 22, however, is outwardly, that is, to the right. Thus an approximate balance of the thrusts is achieved. The bearings 27 and 28 are, therefore, nearly free of thrust load.

The teeth of the helical gear 52 are of opposite hand to the splines 53. Gear 52 is a right hand gear when the helical splines are left-handed as shown. The lead, or axial advance, of the teeth of the gear 52 is, however, equal to the lead of the splines 53. When the gear 52 drives in the direction 58, the thrust reaction exerted on its teeth is to the left while the thrust reaction exerted on the gear by the splines 53 is to the right. The two reactions are always opposite. When the same power or torque is transmitted through the splines 53 and through the teeth of the gear 52, these two reactions are also equal and balance one another. This is on account of the equal lead provided on said teeth and on the splines.

The gear 52 is in balance axially only when the power split is equal, that is, when the same power is transmitted to two oppositely rotating hypoid pinions 20 and 21, and provided that no appreciable end thrust is applied through the universal joint member 50. Gear 52 automatically moves to an axial position along the shank of drive pinion 20 which gives this equal division of power and this balance. An axial displacement of gear 52 rotates one hypoid pinion with respect to the other and causes them to have the relative turning positions in which equal power is transmitted.

This construction, which permits control of the power distribution to the two hypoid drive pinions and which comprises use of a helical drive gear and helical splines, is an important feature of the present invention. Through it the power distribution is independent of the elastic deflections of the parts and can be controlled far better. It is to be understood, however, that the power distribution may be obtained in other ways than through use of a helical drive gear and helical splines, and that the invention is therefore, not limited to use of such power-distributing means. It is to be noted, however, that the helical drive gear 52 is disposed between the power-input end of the drive and the hypoid pinion 20, which is coaxial with it. This location of the drive gear is a feature of all embodiments of the invention.

The pinion being the smaller member of a hypoid drive pair is always the weaker. By use of two hypoid drive pinions 20 and 21, therefore, greater power or torque can be transmitted through a drive of a given size. Thus, with a drive such as described, a smaller ring gear 22 can be employed and the same power or torque can be transmitted to the axle shafts as with a ring gear of conventional size. Thus, the drive can be made more compact; the road clearance can be increased; and the body of the vehicle can further be lowered. The equal division of the power or torque between the drive pinions 20 and 21 enables the optimum results to be obtained in all these regards.

Reference will now be had to Figs. 3 to 6 inclusive, which illustrate further embodiments of the invention. Here, again a hypoid drive is employed in which the hypoid ring gear is driven by two hypoid pinions. The driven gear is denoted at 62. The two hypoid drive pinions are designated 60 and 61. They are of the same hand and may be identical so far as their teeth are concerned. They are mounted to rotate on parallel axes extending at right angles to the axis of the gear and are disposed, respectively, below and above the axis of the gear and to the right and the left of this axis, respectively.

Figure 2:
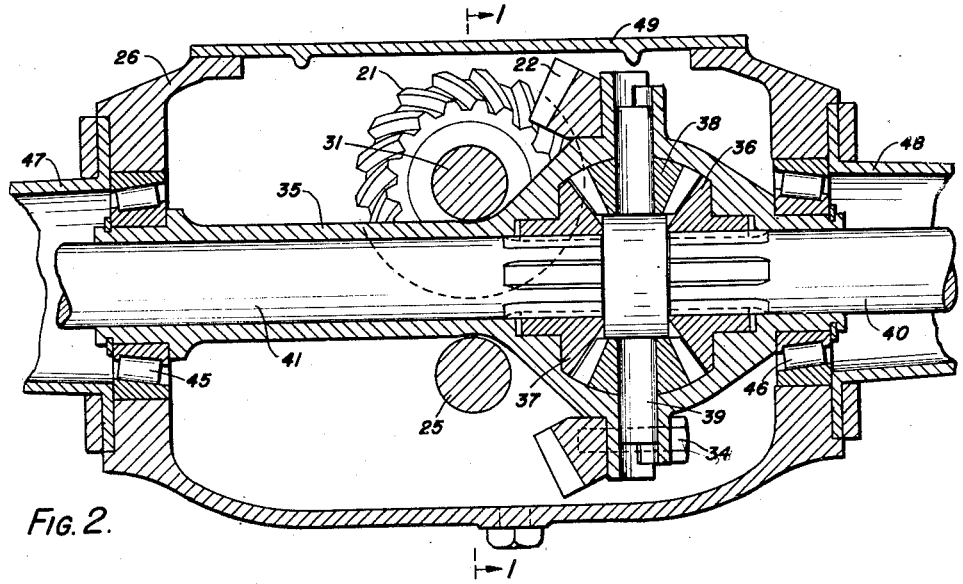
Fig. 2 is a section through this drive taken on the line 2—2 of Fig. 1.

The connection of the gear with the axle shafts of the vehicle may be the same as in the embodiment of Figs. 1 and 2 and need not further be described. The power is transmitted to the drive through a shaft 64 which is journaled on anti-friction bearings 65 and 66. The bearing 65 is mounted in an end cap 67 of casing 68, and the bearing 66 is mounted in the enlarged left end of a shaft 69 that is axially aligned with shaft 64 and is rigidly connected by a face coupling 70 with hypoid drive pinion 60. A bolt 71, which is mounted in the shank of the pinion 60 and which threads into the shaft 69, serves to secure this coupling in fixed position. The shaft 69 and the hypoid pinion 60, which is coupled to it, are journaled in the casing 68 on anti-friction bearings 72 and 73.

Integral with the power input shaft 64 is a helical pinion 75. This pinion meshes with a helical gear 76, which is integral with another helical gear 77. The two gears 76 and 77 are mounted on the shank 89 of the hypoid pinion 61 and are slidable along splines formed on said shank. The shank 89 is journaled in the casing 68 on anti-friction bearings 79 and 80. The helical gear 77 meshes with a helical gear 82 which is integral with the shaft 69 and is formed at the left hand end thereof. The helical gears 75 and 76 have unequal numbers of teeth, the pinion 75 having the smaller number of teeth, while the helical gears 77 and 82 have equal numbers of teeth, when the drive pinions 60 and 61 have, as shown, equal numbers of teeth.

The splines of the shank 89 of drive pinion 61 may be made either straight or helical.

Figures 3, 4, 5, 6:
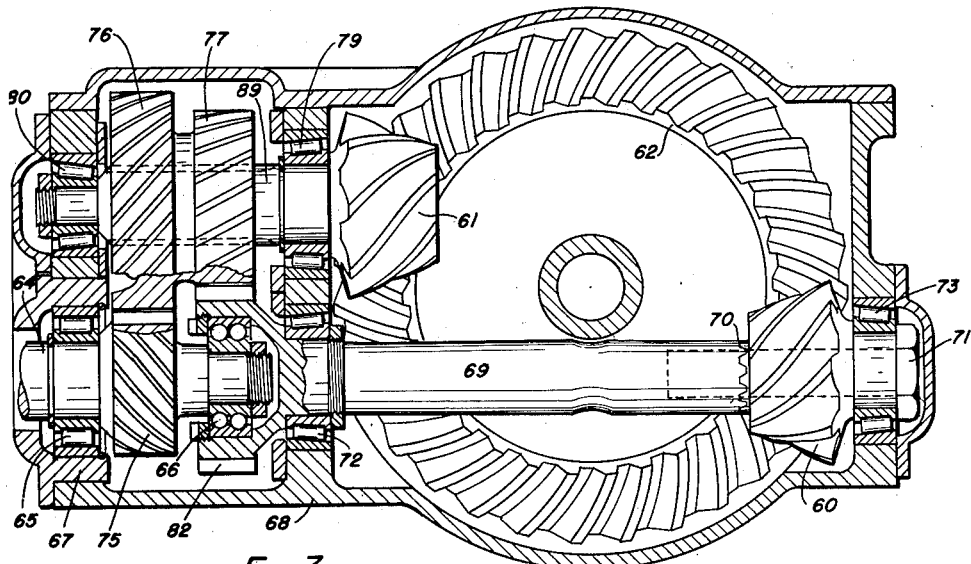
Fig. 3 is a sectional view similar to the section of Fig. 1 and showing another embodiment of the invention.
Fig. 4 is a part elevational, part sectional view showing one way in which the gears, which control distribution of the load between the two drive pinions in the embodiment of the invention illustrated in Fig. 3, may be constructed and mounted.
Fig. 5 is a similar view showing another way in which these gears may be constructed and mounted.
Fig. 6 is a diagram explanatory of the principles involved in the distribution of load to these two gears.

In the diagram of Fig. 6, 83 denotes the direction, at a pitch point 84, of the teeth of a gear, which may be either straight or helical. Distance 84—85 is the developed circumference of the pitch surface of the gear whose radius may be denoted by R. This distance equals $2\pi R$. Distance 84—86 is the lead of the teeth, that is, their axial advance per complete turn. Angle $h$ is the helix angle of the teeth at the pitch radius R. It is seen, then, that:

$$\tan h = \frac{2\pi R}{L}$$

The tooth pressure is in a plane normal to the tooth or substantially so. When the distance 84—87 represents the tooth load as projected to the pitch plane, its components 84—85 represents the tangential or useful tooth load and its component 85—87 represents the axial thrust component.

$$(85—87) = 84—85) . \tan h$$

The axial thrust component depends on the torque M and on lead L and is independent of the radius R. Thus:

$$(85—87) = (84—85)\frac{2\pi R}{L}$$

and:

$$M = (84—85) . R$$

and:

$$(85—87) = M\frac{2\pi}{L}$$

Let L' denote the lead of the teeth of the gear 76 and L" the lead of the teeth of the gear 77.

In Figs. 3 and 5, two helical gears 76 and 77 are shown that are of the same hand and are connected with the shank 89 of hypoid drive pinion 61 through helical splines which are provided on said shank. Fig. 4 shows an alternative arrangement comprising two helical gears 76' and 77' which are again of the same hand but are of slightly different leads from gears 76 and 77, respectively, and which may be substituted in the drive of Fig. 3 when the shank of hypoid pinion 61 is provided with straight axial splines 89'.

When straight splines are used, the axial thrust resulting from the tooth pressure exerted on gear 76' should balance the axial thrust reaction of gear 77' at the desired distribution of load if the desired results are to be attained. Gear 77' is to transmit half as much torque as received by gear 76'. The other half of the torque is to be transmitted to hypoid pinion 61. The equation for thrust balance is $$\frac{M}{L'} = \frac{\frac{1}{2}M}{L''}$$

Hence:

$$L' = 2L''$$

When the leads are in this relationship, as illustrated in Fig. 4, axial balance exists only when the torque is split up into two equal amounts, of which one part is transmitted to hypoid pinion 61 and the other part is transmitted to hypoid pinion 60. This lead relationship, therefore, causes the two pinions to transmit the same power regardless of deflections and without requiring undue manufacturing precision. It is seen that this load distribution device is of utmost simplicity.

With straight splines, the gears 76' and 77' exert no axial thrust on the shank 89' of pinion 61. Likewise, the thrusts of pinion 75 and gear 82 are in balance and add up to zero. The bearings 72 and 73 therefore have to take only such axial thrust as result from the mesh of hypoid pinion 60 and gear 82. Likewise, bearings 79 and 80 have to take only the axial thrust of hypoid pinion 61.

When helical splines 89 are used on the shank of the pinion 61 (Fig. 5), a thrust load opposite to the thrust load of the pinion 61 should be achieved in addition to effecting the desired distribution of power. In this way, the thrust load of this drive pinion 61 may be balanced and the pinion bearings 79 and 80 then do not have to take much axial thrust.

Let L denote the lead of the helical splines 89. There is only a minimum thrust load on the bearings 79 and 80 when the lead L is made equal to the average lead of the two sides of the teeth of the hypoid pinion 61. The equation for thrust balance of the member containing the gears 76 and 77 is then for equal transmission of power to the two hypoid pinions 60 and 61:

$$\frac{M}{L'} - \frac{\frac{1}{2}M}{L''} = \frac{\frac{1}{2}M}{L}$$

and:

$$\frac{2}{L'} = \frac{1}{L''} + \frac{1}{L}$$

When helical splines are used, gear 76 has a smaller lead than gear 77. When straight splines are employed, corresponding gear 76' has a larger lead than gear 77' which is integral therewith. The leads of the two gears should be substantially different from each other to effect the desired load distribution reliably.

When helical splines are used, the thrust reaction of the two gears 76 and 77 is opposed to the thrust reaction of pinion 61 and nearly cancels out that thrust reaction. Likewise, the added thrust reaction of the two gears 75 and 82 is opposed to and nearly cancels out the thrust reaction of hypoid pinion 60.

It is also possible to split up the power into any desired unequal parts. If $kM$ is the moment to be transmitted to pinion 61 and $(1-k)M$ is the moment to be transmitted to the pinion 60, the thrust equation is:

$$\frac{1}{L'} = \frac{1-k}{L''} + \frac{k}{L}$$

Figure 7:
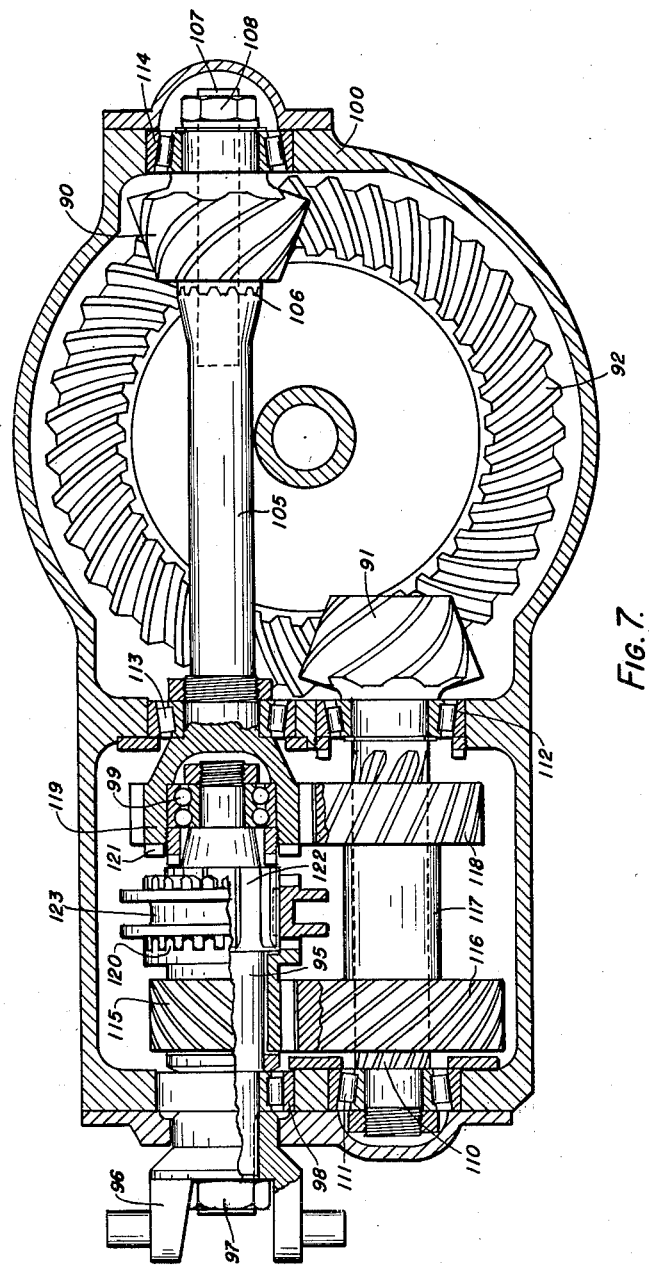
Fig. 7 is a view similar to Figs. 1 and 3 and illustrating a two speed axle constructed according to a further embodiment of the invention.

Unequal power split-up can be resorted to in a selective two speed drive such as illustrated in Fig. 7. This unit is usually a reduction unit and may be used in the rear axle of an automotive vehicle or elsewhere. Again, two hypoid pinions, denoted at 90 and 91, respectively, are used as the drive members. These mesh with a driven hypoid gear 92 which may be connected with the rear axle of the vehicle through a differential as shown in Fig. 2. The hypoid pinions 90 and 91 are of the same hand, the same tooth numbers and may be identical except for their shanks. The axes of the pinions are parallel and the axes of both are disposed at right angles to the axis of the gear 92. The hypoid pinion 90 is disposed above and to the right of the axis of the gear, while the hypoid pinion 91 is disposed below and to the left of this axis.

The power input is through a drive shaft 95 to which motion may be transmitted from a power source through a universal joint of which one member is denoted at 96. This member may be keyed to the shaft 95 and secured to it by a nut 97 which threads on the shaft.

The shaft 95 is journaled on anti-friction bearings 98 and 99. The bearing 98 is mounted in casing 100. The bearing 99 is journaled in the enlarged left hand end of a shaft 105 which is connected by a face coupling 106 to the hypoid pinion 90. A bolt 107 and nut 108 serve to secure the coupling in fixed position. Casing 100 is split on the level of shaft 105.

The pinion 91 is journaled by means of its shank portion 110 on anti-friction bearings 111 and 112 in the casing 100.

Rotatably mounted on shaft 95 is a helical pinion 115 which meshes with a helical gear 116 that is integral with a sleeve 117. Another helical gear 118 is integral with this same sleeve and meshes with a helical gear 119 that is formed integral with the left hand end of shaft 105. The gears 116 and 118 and their sleeve or hub 117 are connected with the shank 110 of pinion 91 by helical splines formed on the pinion shank.

The helical pinion 115 is formed at one side with face clutch teeth 120. The helical gear 119 is formed at one side with face clutch teeth 121. The shaft 95 is provided for a portion of its length with straight splines as denoted at 122. A shiftable member 123 is slidably mounted on these splines. It has face clutch teeth at its opposite ends which are adapted to engage, respectively, the face clutch teeth 120 and 121 of the helical gear members 115 and 119 in the two axial positions to which it may be shifted.

When the shiftable member 123 is in left hand position as shown, pinion 115 is connected with shaft 95 and then drives helical gear 116. Power is then applied in the desired proportion to hypoid pinion 91 and through helical gears 118 and 119 to hypoid pinion 90. The power distribution is effected as described with reference to Figs. 3 and 5. When the shiftable member 123 is in its right hand position, it couples the gear 119 directly to shaft 95 to cause hypoid pinion 90 to be driven directly from the source of power, thus giving higher speed. Pinion 91 then idles.

The load distribution device only operates at the lower speed, therefore, but this is where the heavier loads occur. With pinion 91 idling at the faster speed, in an automotive rear axle drive, pinion 90 carries a load more often. For this reason, it may be desirable to let pinion 91 carry more than half the load at lower speed to attain equal life on both pinions. This can be done by provision of suitable leads on splines 110 and helical gears 116 and 118 as has already been shown.

While the invention has been described in connection with hypoid drives, it will be understood that it is capable of application to all types of gear drives with angularly disposed axes. Moreover, while the invention has been described as applied to rear axle drives of automotive vehicles, it is to be understood that it is not confined to such application, but may be used generally in any drive with angularly disposed axes, either of the reduction type or of the speed-up type. In general, then, while the invention has been described in connection with several different specific embodiments thereof, it is capable of further modification and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A gear drive comprising a driven hypoid gear, a pair of hypoid drive pinions meshing with said gear at diametrically opposite points around the gear and having parallel axes off-set from and disposed at right angles to the gear axis, two helical gears mounted coaxial with one of said drive pinions, two helical gears mounted coaxial with the other drive pinion and meshing, respectively, with the first two helical gears, the two last-named helical gears being so connected with the hypoid drive pinion which is coaxial therewith that said coaxial hypoid drive pinion is rotated on rotation of either of said two last-named, helical gears, and one of the first-named helical gears being so connected with the other hypoid drive pinion which is coaxial therewith that said other hypoid drive pinion is rotated on rotation of said one first-named helical gear, a power shaft, and means for selectively connecting said power shaft to the either of said two first-named helical gears, said two first-named helical gears having teeth of opposite hand to the teeth of the hypoid pinion which is coaxial with said two helical gears and said two last-named helical gears having teeth of the same hand as the teeth of the hypoid pinion which is coaxial with said two last-named helical gears.

2. A gear drive comprising a driven gear, a pair of drive pinions meshing with said driven gear at spaced points around the gear, said pinions having teeth inclined longitudinally to their axes, and means for driving both said pinions simultaneously so that both drive the gear simultaneously comprising a pair of intermeshing helical gears coaxial with said two pinions, respectively, and so connected, respectively, with said two pinions that each pinion is rotated on rotation of its coaxial helical gear, one of said connections being an axially slidable connection through helical splines that form part of the coaxial drive pinion and that are of the same hand as the teeth of the drive pinion, the helical gear, which is connected to one of the drive pinions through said splines, being of opposite hand to the teeth of said drive pinions and the helical gear, which is connected to the other drive pinion, being of the same hand as the teeth of the latter drive pinion, and means for transmitting motion from a power source to the first helical gear, so that power is transmitted through said helical gears to said two pinions.

3. A gear drive comprising a driven gear, a pair of drive pinions meshing with said driven gear at diametrically opposite points around the gear with their axes angularly disposed to and off-set in opposite directions from the axis of said driven gear, said pinions having teeth inclined longitudinally to their axes and means for driving both said pinions simultaneously so that both drive the gear simultaneously comprising a pair of intermeshing gears coaxial with said two pinions, respectively, and so connected with said two pinions that the pinions rotate on rotation of said pair of intermeshing gears, one of said connections being a slidable connection through helical splines that form part of the coaxial drive pinion and that are of the same hand as the teeth of the pinion, and means for transmitting motion from a power source to the gear so connected, so that power is transmitted through said intermeshing gears to said two pinions.

4. A gear drive comprising a driven gear, a pair of drive pinions meshing with said driven gear at diametrically opposite points around the gear with their axes angularly disposed to and off-set in opposite directions from the axis of said driven gear, said pinions having teeth inclined longitudinally to their axes and of the same hand, and means for driving both said pinions simultaneously so that both drive the gear simultaneously comprising a pair of helical gears coaxial with said two drive pinions, respectively, and so connected with said two pinions that the pinions rotate on rotation of the helical gears, one of said connections being a sliding splined connection, and one of said helical gears being of the same hand as its coaxial drive pinion, the other helical gear being of opposite hand to its coaxial drive pinion, and means for transmitting motion from a power source to one of said helical gears, so that power is transmitted through said helical gears to said two pinions.

5. A gear drive comprising a driven gear, a pair of drive pinions meshing with said driven gear at diametrically opposite points around the gear with their axes angularly disposed to and off-set in opposite directions from the axis of said driven gear, said pinions having teeth longitudinally inclined to their axes and of the same hand, a helical driving gear, a helical gear meshing therewith and driven thereby, a third helical gear secured to the second helical gear to rotate therewith, a fourth helical gear meshing with the third helical gear and driven thereby, said second and third helical gears being coaxial with one of said drive pinions to rotate therewith and having a sliding splined connection therewith and being of the same hand as said drive pinion, said fourth helical gear being operatively connected to the other drive pinion to rotate therewith and being of opposite hand thereto, and means for transmitting motion from a power source to the first helical gear, so that power is transmitted through said helical gears to said two pinions.

6. A gear drive comprising a driven gear, a pair of drive pinions meshing with said driven gear at diametrically opposite points around the gear with their axes angularly disposed to and off-set in opposite directions from the axis of said driven gear, said pinions having teeth longitudinally inclined to their axes and of the same hand, a helical driving gear, a helical gear meshing therewith and driven thereby, a third helical gear secured to the second helical gear to rotate therewith, a fourth helical gear meshing with the third helical gear and driven thereby, said second and third helical gears being coaxial with one of said drive pinions and having sliding connection therewith through straight axial splines forming part of said drive pinion, said second and third helical gears having teeth of the same hand as the coaxial drive pinion but the second helical gear having teeth of greater lead than the teeth of the third helical gear, said fourth helical gear being connected to the other drive pinion to rotate therewith and being of opposite hand thereto, said first helical gear having a smaller number of teeth than said second helical gear, and means for transmitting motion from a power source to the first helical gear, so that power is transmitted through said helical gears to said two pinions.

7. A gear drive comprising a driven gear, a pair of drive pinions meshing with said driven gear at diametrically opposite points around the gear with their axes angularly disposed to and off-set in opposite directions from the axis of said driven gear, said pinions having teeth longitudinally inclined to their axes and of the same hand, a helical driving gear, a helical gear meshing therewith and driven thereby, a third helical gear secured to the second helical gear to rotate therewith, a fourth helical gear meshing with the third helical gear and driven thereby, said second and third helical gears being coaxial with one of said drive pinions and having sliding connection therewith through helical splines forming part of said drive pinion and of the same hand as said drive pinion, said second and third helical gears having teeth of the same hand as the coaxial drive pinion but the second helical gear having teeth of smaller lead than the teeth of the third helical gear, said fourth helical gear being connected to the other drive pinion to rotate therewith and being of opposite hand thereto, said third and fourth helical gears having the same numbers of teeth but said first helical gear having a smaller number of teeth than said second helical gear, and means for transmitting motion from a power source to the first helical gear.

8. A gear drive comprising a hypoid driven gear, a pair of longitudinally curved tooth hypoid drive pinions meshing with said driven gear at diametrically opposite points around said gear with their axes parallel and off-set in opposite directions from and disposed at right angles to the axis of said driven gear, a pair of intermeshing helical gears mounted coaxially with and so connected to the two drive pinions that the pinions rotate on rotation of the helical gears, one of said connections being a slidable connection through helical splines that form part of the coaxial drive pinion and that are of the same hand as said coaxial drive pinion, the helical gear connected through said splines having teeth of opposite hand but of equal lead to said splines, and means for transmitting motion from a power source to said one helical gear, so that power is transmitted through said helical gears to said two pinions.

9. A gear drive comprising a hypoid driven gear, a pair of hypoid drive pinions meshing with said driven gear at diametrically opposite points around said gear with their axes parallel and angularly disposed to and off-set in opposite directions from the gear axis, a helical pinion coaxial with one of said hypoid pinions, two helical gears rigidly secured to one another and slidably mounted on straight axial splines operatively forming part of the other hypoid pinion, one of said two helical gears meshing with said helical pinion, a helical gear meshing with the other of said two helical gears and secured to the first hypoid pinion to rotate therewith, the teeth of the two rigidly connected helical gears being of the same hand and the lead of the teeth of one of said two gears being twice as large as the lead of the teeth of the other of said two gears, and means for transmitting motion from a source of power to said helical pinion.

10. A gear drive comprising a driven hypoid gear, two hypoid drive pinions meshing with said gear at diametrically opposite points around said gear with their axes parallel and angularly disposed to and off-set in opposite directions from the axis of said gear, a helical drive pinion mounted coaxial with one of said hypoid pinions and having teeth of opposite hand thereto, two helical gears which are rigidly secured to one another and which are slidably connected to the other hypoid pinion by helical splines forming an operative part of said other hypoid pinion, said two helical gears being of the same hand as said helical splines and of the same hand as the hypoid pinions, one of said two helical gears meshing with said helical drive pinion, a third helical gear meshing with the other of said two helical gears and operatively connected with the first hypoid drive pinion to rotate therewith, and means for selectively connecting a source of power either with said helical drive pinion or with said last-named helical gear, the ratio of the tooth numbers of the helical drive pinion and such meshing helical gear being different from the ratio of the tooth numbers of the other helical gears.

11. A gear drive comprising a driven gear, two drive pinions meshing with said gear at spaced points around the gear with their axes angularly disposed to and off-set in opposite directions from the axis of the gear, and means for driving the two pinions simultaneously and for distributing the loads to the two pinions in a predetermined proportion comprising a pair of helical gears, means comprising helical splines for operatively connecting one of said helical gears with one drive pinion so that said one helical gear and said one drive pinion rotate together, and means for operatively connecting the other helical gear with the other drive pinion to rotate therewith, and means for transmitting motion from a power source to one of said helical gears, so that power is transmitted through said helical gears to said two pinions.

12. A gear drive comprising a driven gear, a pair of drive pinions meshing with said gear with their axes offset from and angularly disposed to the axis of said gear, and means for driving both of said pinions simultaneously so that both drive the gear simultaneously comprising a pair of meshing gears, one of which is coaxial with each pinion and both of which are connected simultaneously to their respective coaxial pinions, each of said two meshing gears being disposed between the source of power and its coaxial pinion, so that power is transmitted through said meshing gears to said pinions to drive the pinions simultaneously.

13. A gear drive comprising a longitudinally curved tooth hypoid driven gear, a pair of longitudinally curved tooth hypoid drive pinions which are of the same hand but which are of opposite hand to the gear and which are mounted on parallel axes which are disposed at right angles to the axis of the gear, one of said pinions being positioned above and the other below the gear axis, and one of said pinions being positioned to the right and the other to the left of the gear axis, and means for driving both of said pinions simultaneously so that both drive the gear simultaneously comprising a pair of meshing gears, one of which is coaxial with each pinion and is so connected thereto, that the pinion rotates on rotation of its coaxial gear, each of said two meshing gears being disposed between the source of power and its coaxial pinion, so that power is transmitted through said meshing gears to said pinions to drive the pinions simultaneously.

14. A gear drive comprising a driven gear, a pair of drive pinions meshing with said gear at diametrically opposite points around the gear and having parallel axes offset from and disposed at right angles to the gear axis, said pinions and gear having teeth inclined longitudinally, the teeth of the two pinions being of the same hand but their hand being opposite to that of the gear, and means for driving both of said pinions simultaneously so that both drive the gear simultaneously comprising a pair of meshing helical gears, one of which is coaxial with each pinion and is so connected thereto that the pinion rotates on rotation of the coaxial helical gear, means for transmitting motion from a power source to one of said helical gears, said one helical gear having teeth of opposite hand to the teeth of the drive pinion which is coaxial therewith, and the mate helical gear having teeth of the same hand as its coaxial drive pinion.

15. A gear drive comprising a driven gear, a pair of drive pinions meshing with said driven gear at spaced points around the gear, said pinions having their axes offset from and angularly disposed to the gear axis, means connecting one of said pinions with a source of power to drive said one pinion, means connecting said connecting means with the other pinion to drive said other pinion upon rotation of said one pinion, said first-named connecting means comprising means for equalizing the loads transmitted to said driven gear by said two pinions.

ERNEST WILDHABER.

REFERENCES CITED

The following references are of record in the file of this patent:

UNITED STATES PATENTS

| Number | Name | Date |
|---|---|---|
| 1,514,522 | Hilmes | Nov. 4, 1924 |
| 2,027,013 | Barnes | Jan. 7, 1936 |
| 2,069,433 | Wildhaber | Feb. 2, 1937 |
| 2,162,979 | Simpson | June 20, 1939 |

FOREIGN PATENTS

| Number | Country | Date |
|---|---|---|
| 424,432 | Germany | Feb. 21, 1925 |
| 357,041 | Italy | Feb. 26, 1938 |